US012101411B2

(12) United States Patent
Wong (10) Patent No.: US 12,101,411 B2
(45) Date of Patent: *Sep. 24, 2024

(54) SYSTEM AND METHOD FOR DECENTRALIZED DIGITAL STRUCTURED DATA STORAGE, MANAGEMENT, AND AUTHENTICATION USING BLOCKCHAIN

(71) Applicant: Alexander Sheung Lai Wong, Waterloo (CA)

(72) Inventor: Alexander Sheung Lai Wong, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,706

(22) Filed: Nov. 22, 2021

(65) Prior Publication Data

US 2022/0086005 A1 Mar. 17, 2022

Related U.S. Application Data

(63) Continuation of application No. 16/434,927, filed on Jun. 7, 2019, now Pat. No. 11,184,174.

(Continued)

(51) Int. Cl.
*H04L 29/06* (2006.01)
*G06F 16/23* (2019.01)
(Continued)

(52) U.S. Cl.
CPC ........ *H04L 9/3236* (2013.01); *G06F 16/2322* (2019.01); *G06F 16/9024* (2019.01);
(Continued)

(58) Field of Classification Search
CPC ... H04L 9/3236; H04L 9/0643; H04L 9/3247; H04L 9/0637; H04L 2209/38;
(Continued)

(56) References Cited

U.S. PATENT DOCUMENTS

9,892,460 B1 * 2/2018 Winklevoss ........... G06Q 40/04
10,068,228 B1 * 9/2018 Winklevoss ............ H04L 9/085
(Continued)

*Primary Examiner* — Mahfuzur Rahman
(74) *Attorney, Agent, or Firm* — Tai W. Nahm; NAHM IP LAW (57) ABSTRACT

There is disclosed a novel system and method for decentralized digital structured data storage, management, and authentication. In an embodiment, the present system comprises pieces of digital structured data (including but not limited to, digital images, digital videos, digital audio, digital text, and digital computational graph representations), computer nodes for storing pieces of digital structured data and for creating references to portions of stored pieces of digital structured data, a network connecting the computer nodes, and a blockchain. In an embodiment, a piece of digital structured data is stored on a computer node, and the computer node creates a reference to a portion of the stored piece of digital structured data. The computer node then broadcasts a request for the reference to be added to the blockchain to all computer nodes through a network connecting all computer nodes. Upon receiving the request, the computer nodes in the network validate the request as well as the status of the computer node. Upon a successful validation of the request, a block is created using the reference along with a timestamp and a digitally signed hash of a previous block, and the block is added to the blockchain. In an illustrative embodiment, a user can validate the authenticity of content within a piece of digital structured data on a computer node by selecting portions of the piece of digital structured data to trace. Each of the selected portions of the piece of digital structured data is then traced on the computer node through the blockchain to trace the original source of the portion of the piece of digital structured data, and identify if the content has been previously modified and by whom.

20 Claims, 7 Drawing Sheets

Related U.S. Application Data

(60) Provisional application No. 62/682,162, filed on Jun. 7, 2018.

(51) Int. Cl.
  *G06F 16/901* (2019.01)
  *H04L 9/06* (2006.01)
  *H04L 9/32* (2006.01)
  *H04L 9/00* (2022.01)

(52) U.S. Cl.
  CPC ........ *G06F 16/9027* (2019.01); *H04L 9/0637* (2013.01); *H04L 9/0643* (2013.01); *H04L 9/3247* (2013.01); *H04L 9/50* (2022.05)

(58) Field of Classification Search
  CPC . H04L 9/3297; H04L 9/3239; G06F 16/9027; G06F 16/9024; G06F 16/2322; G06F 21/64; G06F 21/6218; G06F 16/27
  See application file for complete search history.

(56) References Cited

U.S. PATENT DOCUMENTS

| | | | | |
|---|---|---|---|---|
| 10,158,480 | B1* | 12/2018 | Winklevoss | H04L 9/3247 |
| 10,673,617 | B1* | 6/2020 | Antoniou | G06F 13/4282 |
| 11,184,174 | B2* | 11/2021 | Wong | H04L 9/0643 |
| 2010/0235285 | A1* | 9/2010 | Hoffberg | G06Q 20/0652 |
| | | | | 705/37 |
| 2010/0317420 | A1* | 12/2010 | Hoffberg | G06Q 30/0282 |
| | | | | 463/1 |
| 2018/0075028 | A1* | 3/2018 | Ruschin | G06Q 10/00 |
| 2019/0138929 | A1* | 5/2019 | Wong | G06N 3/045 |
| 2019/0318348 | A1* | 10/2019 | Brenner | G06Q 20/1235 |

* cited by examiner

SYSTEM AND METHOD FOR DECENTRALIZED DIGITAL STRUCTURED DATA STORAGE, MANAGEMENT, AND AUTHENTICATION USING BLOCKCHAIN

CROSS-REFERENCE TO RELATED APPLICATIONS

This application is a continuation of U.S. patent application Ser. No. 16/434,927, filed Jun. 7, 2019, which claims the benefit of U.S. Provisional Patent Application No. 62/682,162, filed Jun. 7, 2018, each of which is incorporated herein by reference in its entirely.

FIELD OF THE INVENTION

The present disclosure relates generally to the field of image storage, management, and authentication, and more specifically to systems and methods for decentralized digital structured data storage, management, and authentication.

BACKGROUND

Digital structured data can be defined as digital data that has a level of organization and relationship with other pieces of digital data. Examples of digital structured data include, but is not limited to, digital images, digital video, digital audio, digital text, and digital computational graph representations. For example, in the case of digital images, a piece of digital information within that digital image could represent the color intensity of a pixel, and this information is related to other pieces of digital information corresponding to other pixels in the image based on a spatial proximity relationship. In another example, in the case of digital audio, a piece of digital information within that digital audio could represent the sound intensity of the audio in the piece of digital information at a particular timepoint, and this information is related to other pieces of digital information corresponding to other timepoints in the audio based on a temporal proximity relationship. With the immense relevance of digital image and audio capture and creation on a wide variety of devices—such as digital still image cameras, digital video cameras, microphones, and computers—there is now a tremendous demand for digital structured data storage, management, and authentication systems to handle this massive wealth of digital structured data.

One of the biggest challenges in digital structured data storage, management, and authentication is to keep track of all structured data transfers and structured data modifications in a manner that allows for authentication, ownership tracking, and structured data editor tracking. In particular, the ability to validate the authenticity of digital structured data and trace its owner has become increasingly important due to the increasing prevalence of digital image, video, audio, and text forgery and fraudulent manipulation, as well as digital copyright conflicts. Currently, existing systems for digital structured data storage, management, and authentication systems are largely centralized systems, and as such, puts all the computational burden on such centralized systems. Furthermore, authentication and tracking on such centralized systems is limited, as there is a lack of any third-party validation. Such centralized systems are also more vulnerable to attack, as the attacks can be a lot more targeted. Finally, existing systems often do not keep track of digital structured data content that may be changed or modified at a sufficient level of detail.

What is needed is an improved system and method for decentralized digital structured data storage, management, and authentication which addresses at least some of these limitations in the prior art.

SUMMARY

The present disclosure relates generally to the field of digital structured data storage, management, and authentication, and more specifically to systems and methods for decentralized digital structured data storage, management, and authentication.

In one aspect, there is disclosed a system in which pieces of digital structured data (including but not limited to digital images, digital audio, digital text, digital video, digital computational graph representations) are stored, managed and authenticated.

In an embodiment, the system comprises computer nodes for storing pieces of digital structured data and for creating references to portions of stored pieces of digital structured data, a network connecting the computer nodes, and a blockchain.

In another embodiment, a piece of digital structured data is stored on a computer node, and the computer node creates a reference to a portion of the stored piece of digital structured data. The computer node then broadcasts a request for the reference to be added to the blockchain to all computer nodes through a network connecting all computer nodes.

Upon receiving the request, other computer nodes in the network validate the request, as well as the status of the broadcasting computer node. Upon a successful validation of the request by the broadcasting node, a new block is created using the reference, along with a timestamp and a digitally signed hash of a previous block, and the new block is added to the distributed blockchain.

In another embodiment, when a portion of a piece of digital structured data is transferred from a source computer node (e.g. the broadcasting node) to a destination computer node (another receiving node in the network), the source computer node digitally signs a hash of the previous block from the blockchain, and the public key of the destination computer node. A new block is created from the digitally signed hash, a reference to the portion of the piece of digital structured data, and a timestamp, and the new block is then added to the end of the blockchain.

In another embodiment, the system is adapted to allow a user to modify a piece of digital structured data on a computer node. The computer node creates a reference to the modified portion of the stored piece of digital structured data. The computer node then broadcasts a request for the reference to be added to the blockchain to all computer nodes through a network connecting the computer nodes. Upon receiving the request, the other computer nodes in the network validate the request as well as the status of the broadcasting computer node. Upon a successful validation of the request, a new block is created using the reference along with a timestamp and a digitally signed hash of the previous block, and the new block is added to the blockchain.

In another embodiment, a user can validate the authenticity of content within a piece of digital structured data on a computer node by selecting one or more portions of the piece of digital structured data to trace. Each selected portion of the piece of digital structured data is traced through the blockchain to the original source of the digital structured data, and if any portion has been previously modified, the system can determine when, and by whom.

In an embodiment, if the system is unable to validate a piece of digital structured data on a computer node with reference to the blockchain, the system is adapted to determine whether the piece of digital structured data may be corrupted, or whether the piece of digital structured data may possibly be from an unidentified external source unknown to the system, if there is no record of a change corresponding to the piece of digital structured data within blockchain. In this event, the system is also adapted to flag the piece of digital structured data for further investigation and authentication, or possible identification and tagging as inauthentic or a possible forgery.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

As noted above, the present disclosure relates generally to the field of digital structured data storage, management, and authentication, and more specifically to systems and methods for decentralized digital structured data storage, management, and authentication.

The present system and method will be better understood, and objects of the invention will become apparent, when consideration is given to the following detailed description thereof. Such description makes reference to the annexed drawings, wherein.

In the drawings, embodiments are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present invention relates to a system and method for decentralized digital structured data storage, management, and authentication.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1:
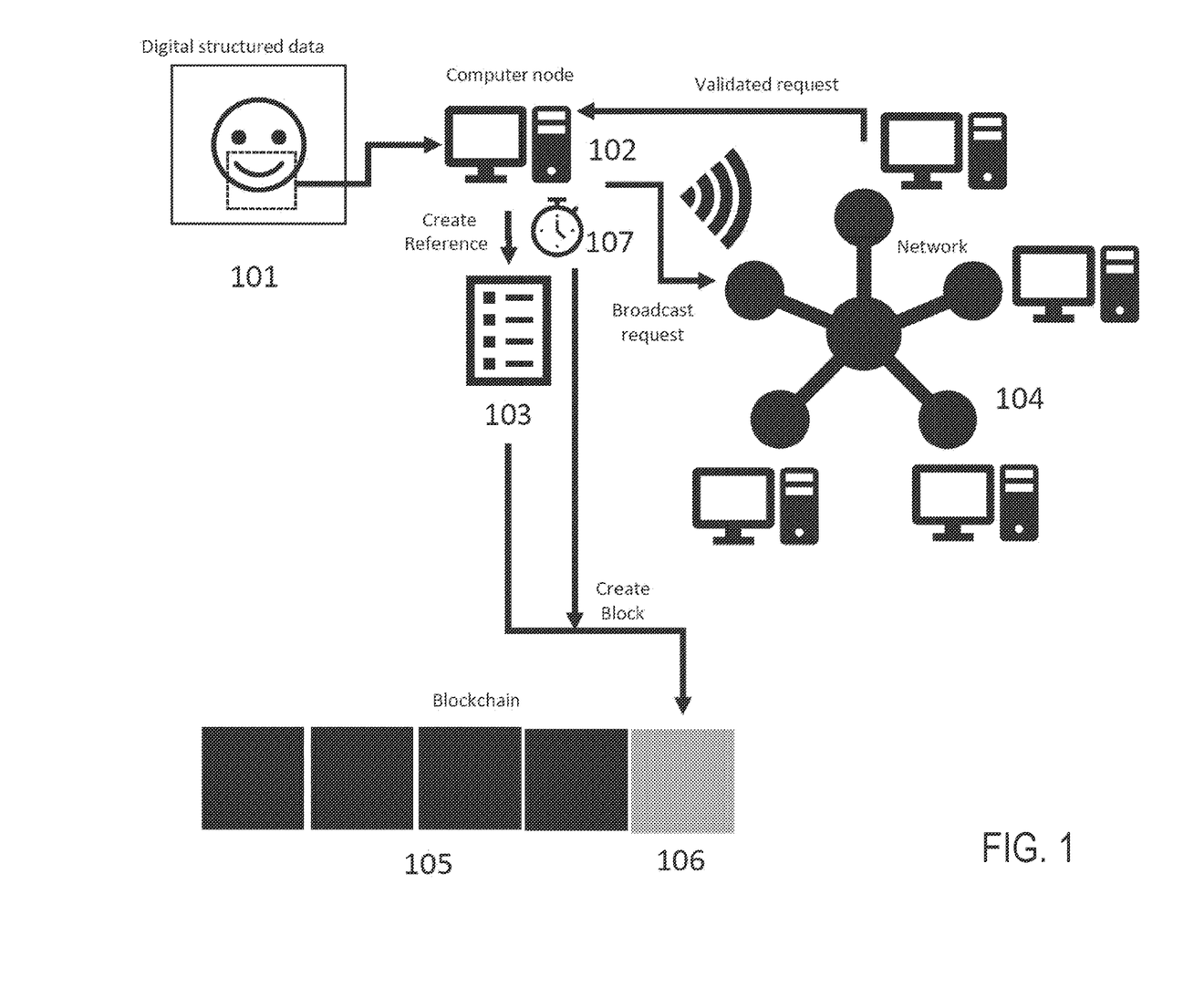
FIG. 1 shows a system in accordance with an illustrative embodiment, comprising pieces of digital structured data, computer nodes for storing pieces of digital structured data and for creating references to portions of stored pieces of digital structured data, a network connecting the computer nodes, and a schematic illustration of a decentralized blockchain.

In one aspect, with reference to FIG. 1, shown is an illustrative example of a system in accordance with an illustrative embodiment. Digital structured data can be defined here as digital data that has a level of organization and relationship with other pieces of digital data. Examples of digital structured data include, but is not limited to, digital images, digital videos, digital audio, digital text, and digital computational graph representations. In an illustrative embodiment, the present system comprises pieces of digital structured data (illustrated here as digital images for illustrative purposes, but is not limited to digital images), computer nodes for storing digital images and for creating references to portions of stored pieces of digital structured data, a network connecting the computer nodes, and a schematic representation of a decentralized blockchain. The decentralized blockchain may be established in any number of computer nodes established in the network. The computer nodes that can participate in the blockchain can depend on the level of permission required by the blockchain. In an embodiment, the blockchain in the present system is a public blockchain where any computer node can participate in the blockchain. In another embodiment, the blockchain in the present system is a permissioned blockchain where a computer node can participate with a certain level of access (including but not limited to: permission to read, permission to perform a transaction, etc.) to the blockchain.

In an embodiment, a piece of digital structured data 101 is stored on a computer node C_i 102, and the computer node C_i 102 creates a reference R_I 103 to a portion of the stored piece of digital structured data 101. A portion of the stored piece of digital structured data (denoted here by I) comprises a set of values within the stored piece of digital structured data, and may contain all values within the stored piece of digital structured data in some cases. The reference to a portion of the stored piece of digital structured data may contain (but is not limited to): the information about the creator or editor of the portion of the piece of digital structured data, a concise digital representation of the portion of the digital piece of digital structured data (for example, in the case where the digital structured data is a digital image, including but not limited to a digital hash, a histogram, a thumbnail, a feature descriptor, and a checksum of the portion of the digital image), a timestamp corresponding to the creation or edit of the portion of the piece of digital structured data, and a computer address pointing to the portion of the piece of digital structured data. The computer node C_i 102 then broadcasts a request for the reference R_I 103 be added to the blockchain B 105 (denoted by Req(R_I, B)) to all computer nodes C_1, C_2, . . . , C_n (where n is the number of nodes in the network N) through a network N 104 connecting all computer nodes. Note that not all computer nodes in the network need to participate in the blockchain, and the level of permission to participate in the blockchain can be different for the different computer nodes in the network. Upon receiving the request Req(R_I,B), the computer nodes in the network N 104 validates the request as well as the status of the computer node C_i 102. Upon a successful validation of the request Req(R_I,B), a block b 106 is created using the reference R_I 103 along with a timestamp T 107, and the block b 106 is added to the decentralized blockchain B 105.

Figure 2:
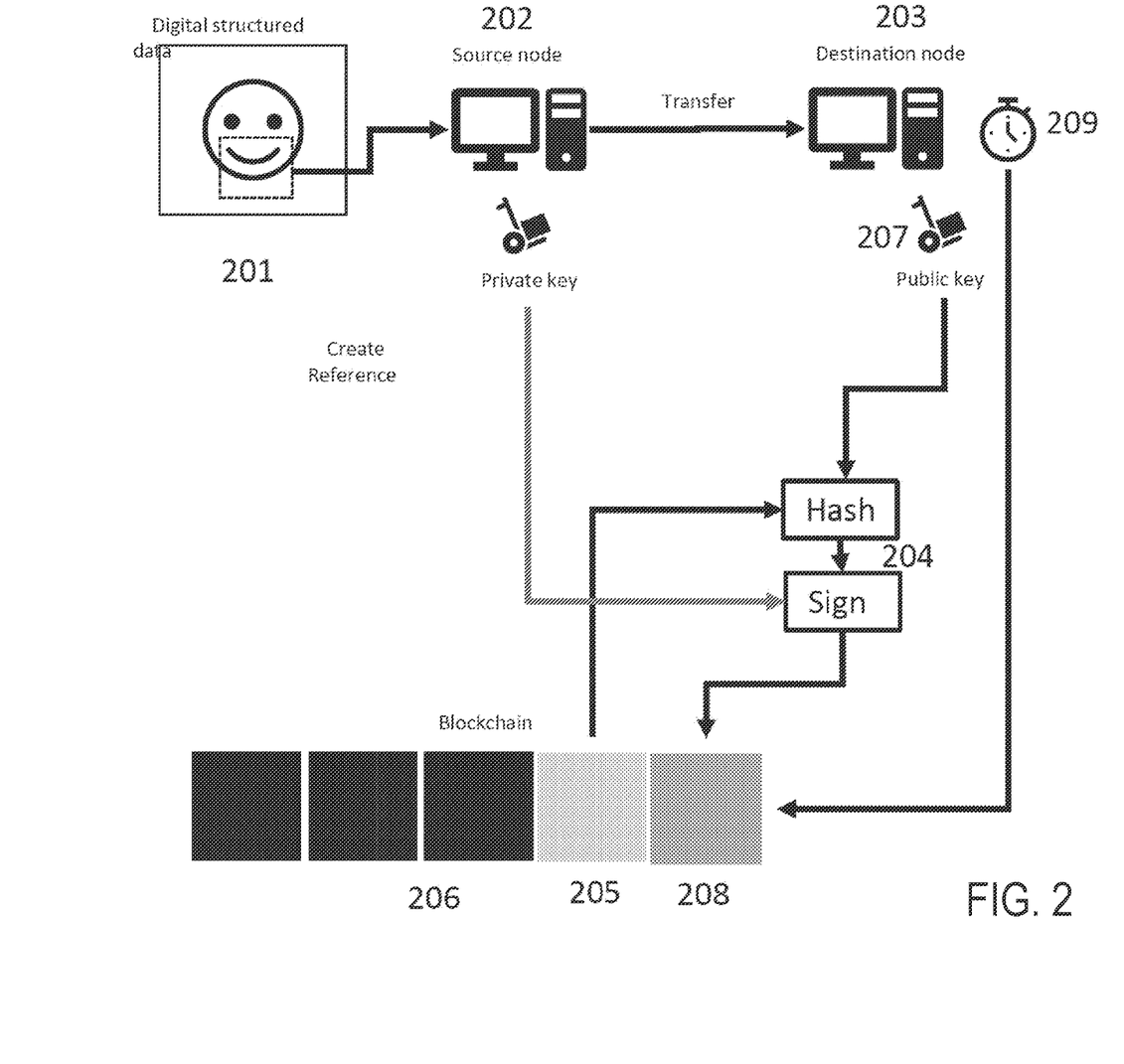
FIG. 2 shows a system in accordance with an illustrative embodiment, comprising a source computer node, and destination computer node, a hash of the previous block from the blockchain, and the public key of the destination computer node.

Now referring to FIG. 2, in an illustrative embodiment, when a portion of a piece of digital structured data 201 is transferred from computer node C_i 202 to a computer node C_j 203, the computer node C_i 202 digitally signs a hash H(b_prev, K(C_j)) 204 of the previous block b_prev 205 from the blockchain B 206 and the public key of computer node C_j (denoted by K(C_j)) 207. A new block b 208 is created from the digitally signed hash H(b_prev, K(C_j)) 204 and timestamp T 209, and the block b 208 is then added to the end of the distributed blockchain B 206.

Figure 3:
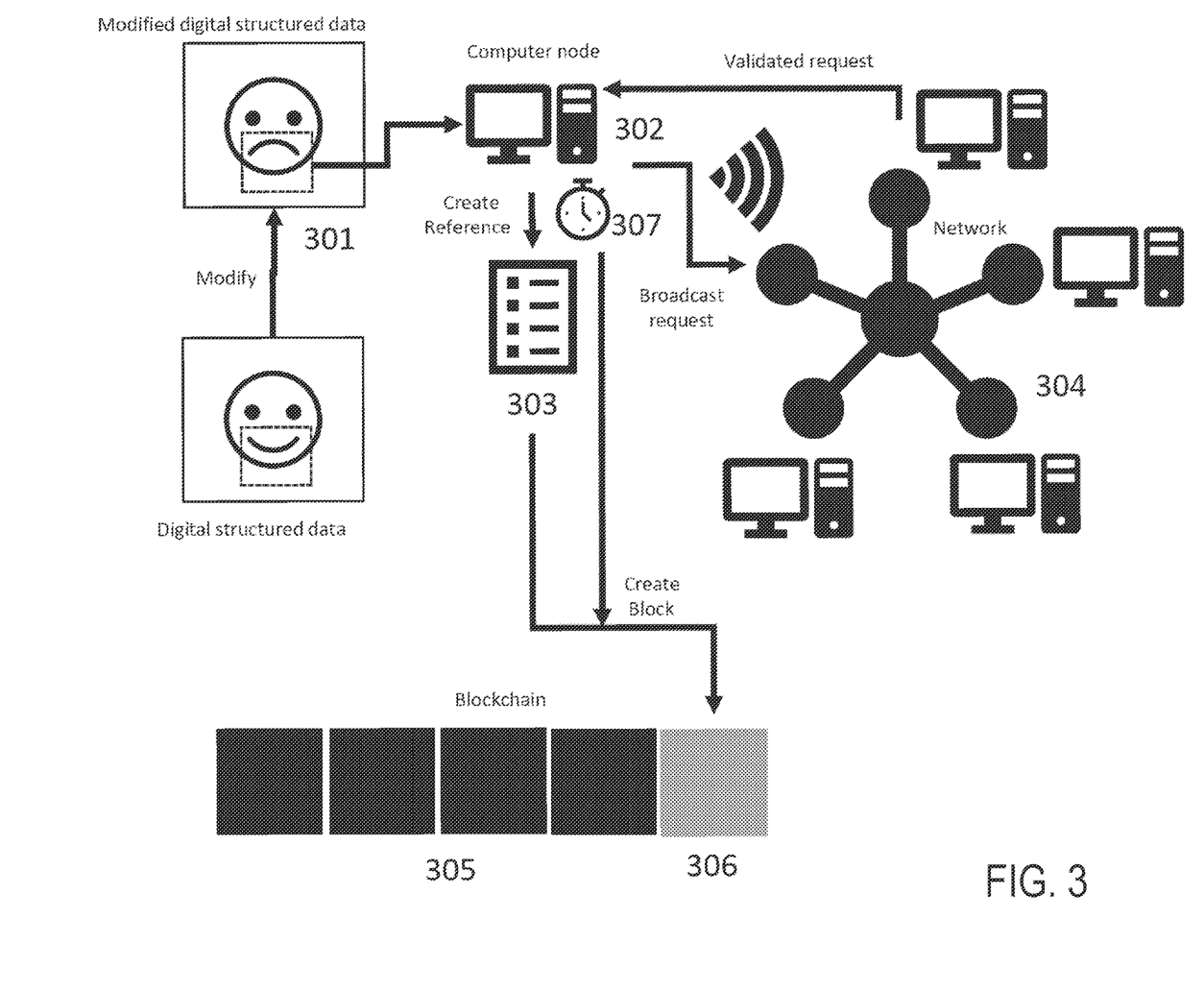
FIG. 3 shows a system in accordance with an illustrative embodiment, comprising a modified piece of digital structured data, computer nodes for storing pieces of digital structured data and for creating references to a portion of the stored piece of digital structured data, a network connecting the computer nodes, and a blockchain.

Now referring to FIG. 3, in another illustrative embodiment, a user modifies a piece of digital structured data 301 on computer node C_i 302. The computer node C_i 302 creates a reference R_Q 303 to the modified portion of the stored piece of digital structured data 301. The computer node C_i 302 then broadcasts a request for the reference R_Q 303 be added to the blockchain B 305 (denoted by Req(R_Q,B)) to all computer nodes C_1, C_2, . . . , C_n (where n is the number of nodes in the network N) through a network N 304 connecting all computer nodes. Upon receiving the request Req(R_Q,B), the computer nodes in the network N 304 validates the request as well as the status of the computer node C_i 302. Upon a successful validation of the request Req(R_Q,B), a block b 306 is created using the reference R_Q 303 along with a timestamp T 307, and the block b 306 is added to the blockchain B 305.

Figure 4:
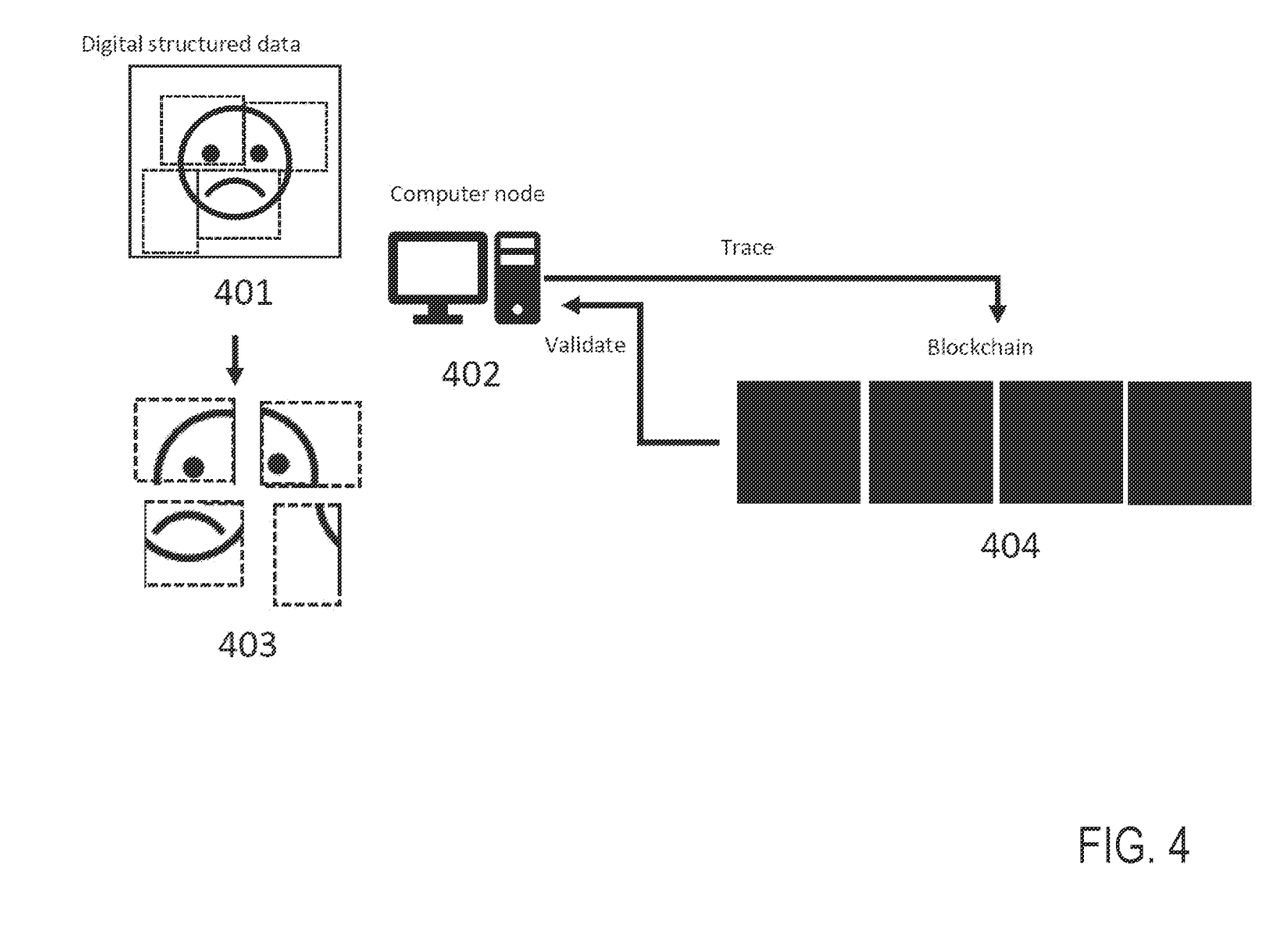
FIG. 4 shows a system in accordance with an illustrative embodiment, comprising a piece of digital structured data, selected portions of a piece of digital structured data, a computer node, and a blockchain.

In an illustrative embodiment, a user can validate the authenticity of content within a piece of digital structured data R 401 on computer node C_i 402 by selecting n portions of the piece of digital structured data R 401 (denoted by P(Q,1), P(Q,2), . . . , P(Q,n) 403) to trace through the blockchain B 404. Each of the selected portions of the piece of digital structured data R 403 is traced on computer node C_i 402 through the blockchain B 404 to identify the original source of the piece of digital structured data, and determine if the content has been previously modified, when the content was modified, and by whom.

In an embodiment, if the system is unable to validate a piece of digital structured data on a computer node C_i 402 with reference to the blockchain B 404, the system is adapted to determine whether the piece of digital structured data may be corrupted, or whether the piece of digital structured data may possibly be from an unidentified external source unknown to the system, if there is no record of a change corresponding to the piece of digital structured data within blockchain B 404. In this event, the system is also adapted to flag the piece of digital structured data for further investigation and authentication, or possible identification and tagging as inauthentic or a possible forgery.

Figure 5:
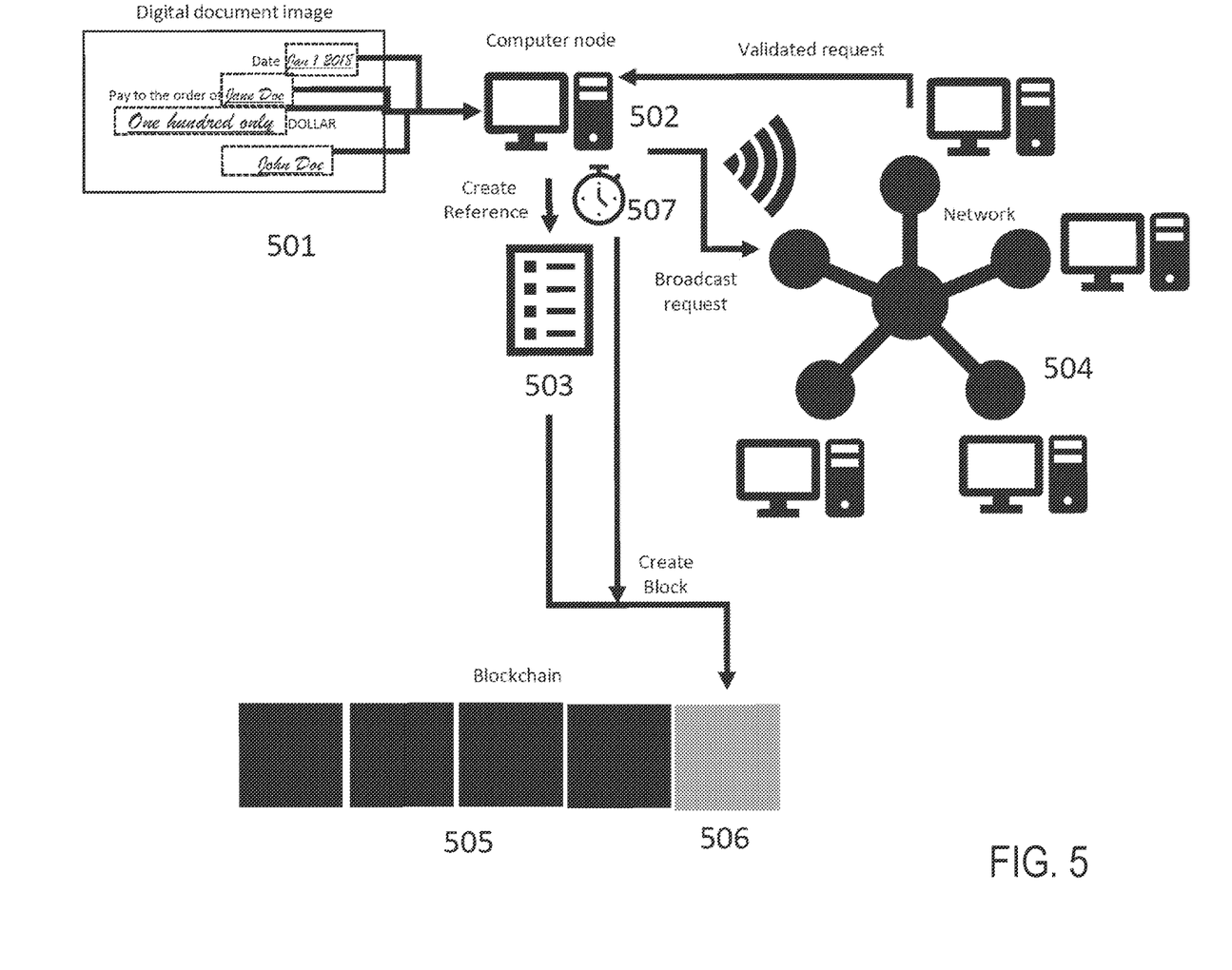
FIG. 5 shows a system in accordance with an illustrative embodiment for the purpose of digital document image storage, management, and authentication, comprising a digital document image, computer nodes for storing digital document images and for creating references to portions of stored digital document images, a network connecting the computer nodes, and a blockchain.

Now referring to FIG. 5, shown is an illustrative example of a system in accordance with an illustrative embodiment for the purposes of digital document image storage, management, and authentication. In this example, the illustrative system comprises digital document images, computer nodes for storing digital document images and for creating references to portions of stored digital document images, a network connecting the computer nodes, and a schematic representation of a decentralized blockchain. In an embodiment, a digital document image 501 is stored on a computer node C_i 502, and the computer node C_i 502 creates a reference R_I 503 to a portion of the stored digital document image 501. A portion of the stored digital document image (denoted here by I) comprises a set of pixels within the stored digital document image, and may contain all pixels within the stored digital document image in some cases. In an example embodiment, references are created to portions of the stored digital document image containing important fields of information (such as, but not limited to: signature, date, names, monetary values, etc.). The reference to a portion of the stored digital document image may contain (but is not limited to): the information about the creator or editor of the portion of the digital document image, a concise digital representation of the portion of the digital document image (including but not limited to a digital hash, a histogram, a thumbnail, a feature descriptor, and a checksum of the portion of the digital document image), a timestamp corresponding to the creation or edit of the portion of the digital document image, and a computer address pointing to the portion of the digital document image.

When a change is made to an important piece of information in the stored digital document image (e.g. signature, date, payee, monetary values have been filled out), the computer node C_i 502 broadcasts a request for a reference R_I 503 be added to the blockchain B 505 (denoted by Req(R_I,B)) to all computer nodes C_1, C_2, . . . , C_n (where n is the number of nodes in the network N) through a network N 504 connecting all computer nodes. Upon receiving the request Req(R_I,B), the computer nodes in the network N 504 validates the request as well as the status of the computer node C_i 502. Upon a successful validation of the request Req(R_I,B), a block b 506 is created using the reference R_I 503 along with a timestamp T 507, and the block b 506 is added to the blockchain B 505.

Figure 6:
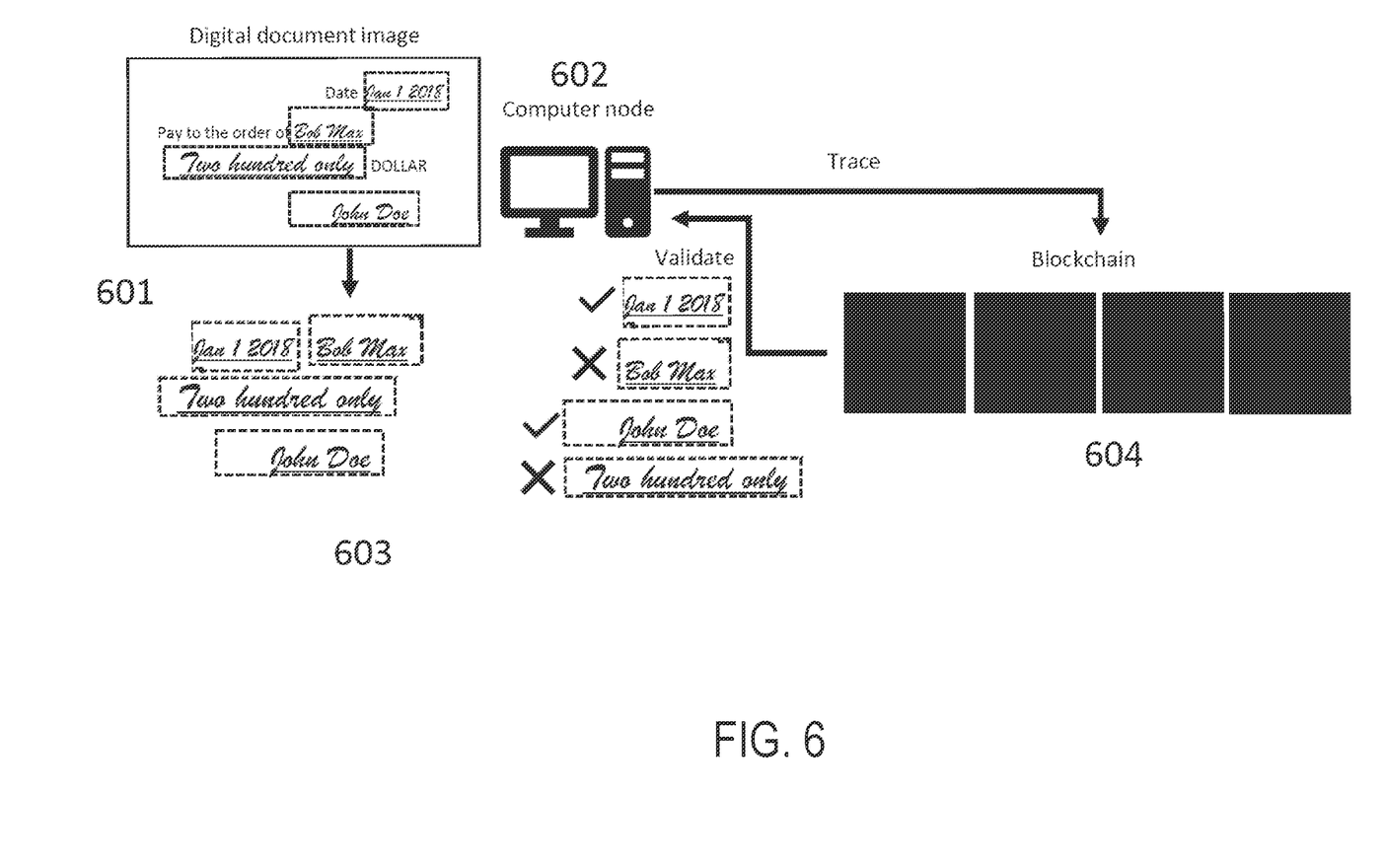
FIG. 6 shows a system in accordance with an illustrative embodiment for the purpose of digital document image storage, management, and authentication, comprising a digital document image, selected portions of a digital document image, a computer node, and a blockchain.

Now referring to FIG. 6, in an illustrative embodiment, for the purposes of digital document image storage, management, and authentication, a user can validate the authenticity of content within a digital document image R 601 on computer node C_i 602 by selecting n portions of the digital document image R 601 (denoted by P(Q,1), P(Q,2), . . . , P(Q,n) 603) to trace through the blockchain B 604. Each of the selected portions of the digital document image R 603 is traced on computer node C_i 602 through the blockchain B 604 to identify the original source of the digital document image portion, and determine if and when the content has been modified to verify the authenticity of the digital document image 601.

As described above, if the system is unable to identify the original source of the digital document image portion, or is unable to verify the authenticity of the digital document image 601 from the immutable records in the blockchain 105, the system is adapted to flag the digital document image 601 for further investigation and authentication. If further investigation cannot authenticate the changes in the digital document image 601, the system is further adapted to tag the digital document image 601 as inauthentic or a possible forgery.

The system may utilize a computing device, such as a generic computing device as described with reference to FIG. 7 (please see below), to perform these computations, and to store the results in memory or storage devices, or embodied in an integrated circuit or digital signal processor in one or more computer nodes as described above.

Figure 7:
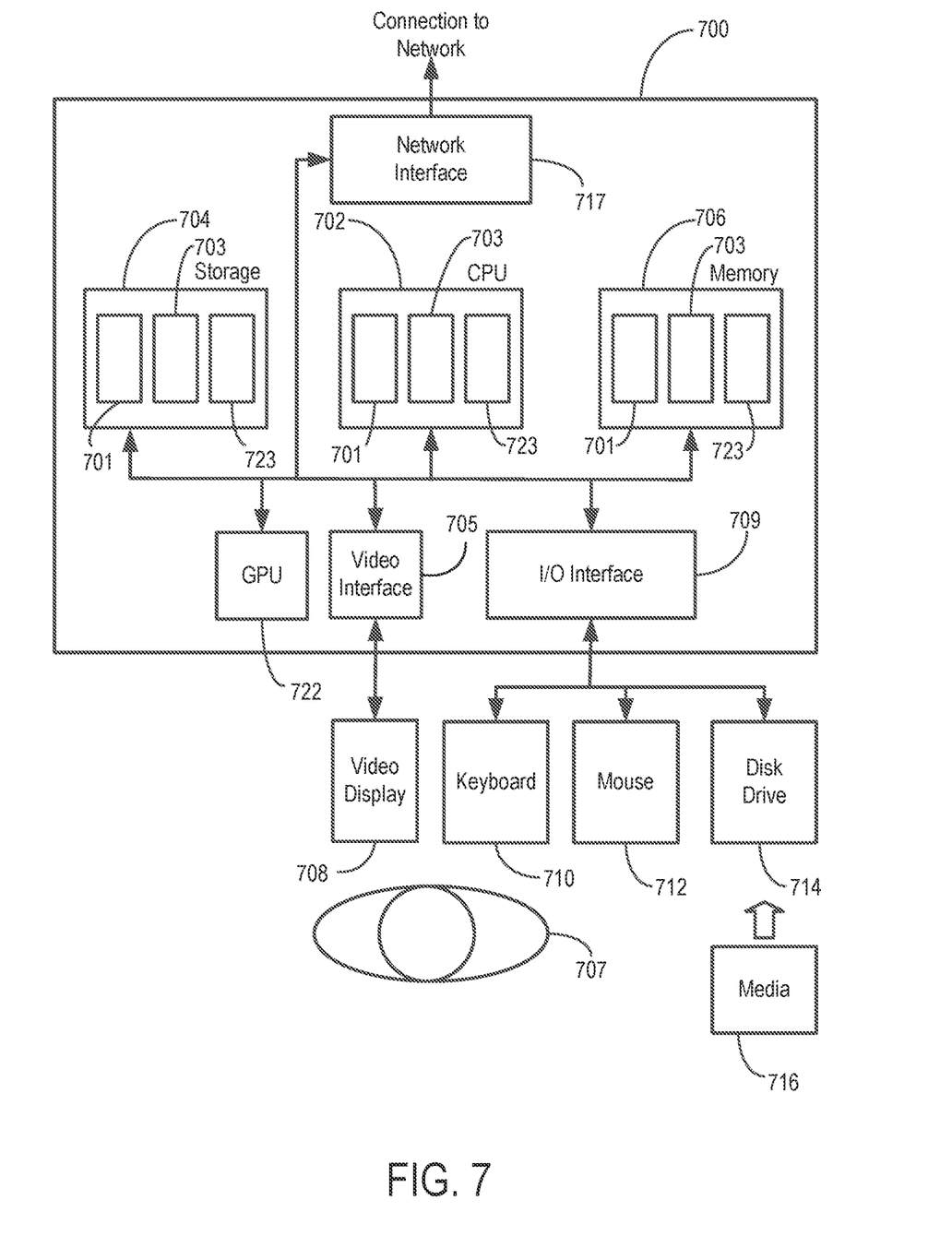
FIG. 7 shows a schematic block diagram of a generic computing device which may provide an operating environment for various embodiments.

Now referring to FIG. 7 shown is a schematic block diagram of a generic computing device that may provide a suitable operating environment in one or more embodiments. A suitably configured computer device, and associated communications networks, devices, software and firmware may provide a platform for enabling one or more embodiments as described above. By way of example, FIG. 7 shows a generic computer device 700 that may include a central processing unit ("CPU") 702 connected to a storage unit 704 and to a random access memory 706. The CPU 702 may process an operating system 701, application program 703, and data 723. The operating system 701, application program 703, and data 723 may be stored in storage unit 704 and loaded into memory 706, as may be required. Computer device 700 may further include a graphics processing unit (GPU) 722 which is operatively connected to CPU 702 and to memory 706 to offload intensive image processing calculations from CPU 702 and run these calculations in parallel with CPU 702. An operator 710 may interact with the computer device 700 using a video display 708 connected by a video interface 705, and various input/output devices such as a keyboard 710, pointer 712, and storage 714 connected by an I/O interface 709. In known manner, the pointer 712 may be configured to control movement of a cursor or pointer icon in the video display 708, and to operate various graphical user interface (GUI) controls appearing in the video display 708. The computer device 700 may form part of a network via a network interface 711, allowing the computer device 700 to communicate with other suitably configured data processing systems or circuits. A non-transitory medium 716 may be used to store executable code embodying one or more embodiments of the present method on the generic computing device 700.

Thus, in an aspect, there is provided a computer-implemented system for decentralized digital structured data storage, management, and authentication within a network, comprising: one or more computer nodes connected to the network, each computer node having a processor and a memory, and at least one of the computer nodes adapted to: hold one or more pieces of digital structured data; create a reference upon creation or modification of any portion of the one or more pieces of digital structured data; and broadcast a request to add the reference to a blockchain; and a decentralized blockchain operatively integrated within the network, the decentralized blockchain adapted to be responsive to the broadcast request from the one or more computer nodes storing pieces of digital structured data to validate the broadcast request, and upon validation, add the reference to the blockchain; whereby, the authenticity of the one or more pieces of digital structured data and any modifications made to any portion of the one or more pieces of digital structured data can be verified by selecting portions of the piece of digital structured data to trace through the corresponding references recorded in the blockchain.

In an embodiment, the pieces of digital structured data comprise one or more of digital images, digital audio, digital text, digital video, and digital computational graph representations.

In another embodiment, the decentralized blockchain comprises one or more computer nodes connected to the network which may or may not hold one or more pieces of digital structured data.

In another embodiment, the decentralized blockchain is adapted to create a new block with a timestamp and a digitally signed hash of a previous block, and add the new block to the distributed blockchain.

In another embodiment, two of the computer nodes comprise a source node and a destination node, and wherein: the source node is adapted to create the reference upon transfer of a portion of a piece of digital structured data from the source node to the destination node; digitally sign a hash of a previous block in the blockchain; digitally sign a public key for the destination node; and request the addition of the reference to a new block in the blockchain.

In another embodiment, the system is further adapted to: determine whether one or more records of one or more pieces of digital structured data and any modifications made to any portion of the pieces of digital structured data appear in the decentralized blockchain; and if the system is unable to determine the authenticity of the one or more stored pieces of digital structured data, to flag the one or more records of one or more pieces of digital structured data.

In another embodiment, the system is further adapted to tag the one or more stored pieces of digital structured data as inauthentic or a possible forgery.

In another aspect, there is provided a method executable on a computer-implemented system for decentralized digital structured data storage, management, and authentication within a network, the method comprising: providing one or more computer nodes connected to the network, each computer node having a processor and a memory, and at least one of the computer nodes adapted to: hold one or more pieces of digital structured data; create a reference upon creation or modification of any portion of the one or more pieces of digital structured data; and broadcast a request to add the reference to a blockchain; and providing a decentralized blockchain operatively integrated within the network, the decentralized blockchain adapted to be responsive to the broadcast request from the one or more computer nodes storing pieces of digital structured data to validate the broadcast request, and upon validation, add the reference to the blockchain; and verifying the authenticity of the one or more pieces of digital structured data and any modifications made to any portion of the one or more pieces of digital structured data can be verified by selecting one or more portions of the piece of digital structured data to trace through the corresponding references recorded in the blockchain.

In an embodiment, the pieces of digital structured data comprise one or more of digital images, digital audio, digital text, digital video, and digital computational graph representations.

In another embodiment, the decentralized blockchain comprises one or more computer nodes connected to the network which may or may not hold one or more pieces of digital structured data.

In another embodiment, the decentralized blockchain is adapted to create a new block with a timestamp and a digitally signed hash of a previous block, and add the new block to the distributed blockchain.

In another embodiment, two of the computer nodes comprise a source node and a destination node, and wherein: the source node is adapted to create the reference upon transfer of a portion of a piece of digital structured data from the source node to the destination node; digitally sign a hash of a previous block in the blockchain; digitally sign a public key for the destination node; and request the addition of the reference to a new block in the blockchain.

In another embodiment, the method further comprises: determining whether one or more records of one or more pieces of digital structured data and any modifications made to any portion of the pieces of digital structured data appear in the decentralized blockchain; and if the system is unable to determine the authenticity of the one or more stored pieces of digital structured data, flagging the one or more records of one or more pieces of digital structured data.

In another embodiment, the method further comprises tagging the one or more stored pieces of digital structured data as inauthentic or a possible forgery.

In another aspect, there is provided a non-transitory computer readable medium storing code executable on one or more computer systems in a network for decentralized digital structured data storage, management, and authentication within a network, comprising: code executable by one or more computer systems in the network for holding one or more pieces of digital structured data; code executable by one or more computer systems in the network for creating a reference upon creation or modification of any portion of the one or more pieces of digital structured data; and code executable by one or more computer systems in the network for broadcasting a request to add the reference to a decentralized blockchain; code executable by one or more computer systems in the network for receiving confirmation that the blockchain has received the broadcast request and, upon validation, added the reference; and code executable by one or more computer systems in the network for verifying the authenticity of the one or more pieces of digital structured data and any modifications made to any portion of the one or more pieces of digital structured data by selecting one or more portions of the piece of digital structured data to trace through the corresponding references recorded in the blockchain.

In an embodiment, the pieces of digital structured data comprise one or more of digital images, digital audio, digital text, digital video, and digital computational graph representations.

In another embodiment, the decentralized blockchain comprises one or more computer nodes connected to the network which may or may not hold one or more pieces of digital structured data.

In another embodiment, the decentralized blockchain is adapted to create a new block with a timestamp and a digitally signed hash of a previous block, and add the new block to the distributed blockchain.

In another embodiment, two of the computer nodes comprise a source node and a destination node, the non-transitory computer readable medium further comprising: code executable on the source node for creating the reference upon transfer of a portion of a piece of digital structured data from the source node to the destination node; code for digitally signing a hash of a previous block in the blockchain; code for digitally signing a public key for the destination node; and code for requesting the addition of the reference to a new block in the blockchain.

In another embodiment, the non-transitory computer readable medium further comprises: code for determining whether one or more records of one or more pieces of digital structured data and any modifications made to any portion of the pieces of digital structured data appear in the decentralized blockchain; and code for flagging the one or more records of one or more pieces of digital structured data if the system is unable to determine the authenticity of the one or more stored pieces of digital structured data.

While illustrative embodiments have been described above by way of example, it will be appreciated that various changes and modifications may be made without departing from the scope of the invention, which is defined by the following claims.

The invention claimed is:

1. A computer-implemented system for decentralized digital structured data storage, management, and authentication within an authentication network, comprising: a plurality of computer nodes configured to participate in the authentication network, each computer node having a processor and a memory, and at least one of the computer nodes adapted to: at least temporarily store one or more pieces of digital structured data; and broadcast to all participating computer nodes a request to authenticate the one or more pieces of digital structured data; and a decentralized blockchain operatively participating in the authentication network, the decentralized blockchain adapted to: be responsive to the broadcast request from the one or more participating computer nodes at least temporarily storing pieces of digital structured data to determine if the creation or modification of the one or more pieces of digital structured data has been previously referenced and added to the blockchain; and if the decentralized blockchain determines that the creation or modification of the one or more pieces of digital structured data has been previously referenced and added to the blockchain, then validate the broadcast authentication request, and upon validation, respond to the at least one broadcasting computer node the validation of authenticity of the one or more pieces of digital structured data.

2. The computer-implemented system of claim 1, wherein the pieces of digital structured data comprise one or more of digital images, digital audio, digital text, digital video, and digital computational graph representations.

3. The computer-implemented system of claim 1, wherein the decentralized blockchain comprises one or more computer nodes operatively participating in the network which may hold one or more pieces of digital structured data.

4. The computer-implemented system of claim 3, wherein the decentralized blockchain is adapted to create a new block with a timestamp upon validating the broadcast authentication request.

5. The computer-implemented system of claim 1, wherein two of the computer nodes comprise a source node and a destination node, and wherein: the source node is adapted to create the reference upon transfer of a portion of a piece of digital structured data from the source node to the destination node; digitally sign a hash of a previous block in the blockchain; digitally sign a public key for the destination node; and request the addition of the reference to a new block in the blockchain.

6. The computer-implemented system of claim 1, wherein the system is further adapted to: determine whether one or more records of one or more pieces of digital structured data and any modifications made to any portion of the pieces of digital structured data appear in the decentralized blockchain; and if the system is unable to determine the authenticity of the one or more stored pieces of digital structured data, to flag the one or more records of one or more pieces of digital structured data.

7. The computer-implemented system of claim 6, wherein the system is further adapted to tag the one or more stored pieces of digital structured data as inauthentic or a possible forgery.

8. A method executable on a computer-implemented system for decentralized digital structured data storage, management, and authentication within an authentication network, the method comprising: providing a plurality of computer nodes configured to participate in the authentication network, each computer node having a processor and a memory, and at least one of the computer nodes adapted to: at least temporarily store one or more pieces of digital structured data; and broadcast to all participating computer nodes a request to authenticate the one or more pieces of digital structured data; and providing a decentralized blockchain operatively participating in the authentication network, the decentralized blockchain adapted to: be responsive to the broadcast request from the one or more participating computer nodes at least temporarily storing pieces of digital structured data to determine if the creation or modification of the one or more pieces of digital structured data has been previously referenced and added to the blockchain; and if the decentralized blockchain determines that the creation or modification of the one or more pieces of digital structured data has been previously referenced and added to the blockchain, then validate the broadcast authentication request, and upon validation, respond to the at least one broadcasting computer node the validation of authenticity of the one or more pieces of digital structured data.

9. The method of claim 8, wherein the pieces of digital structured data comprise one or more of digital images, digital audio, digital text, digital video, and digital computational graph representations.

10. The method of claim 8, wherein the decentralized blockchain comprises one or more computer nodes operatively participating in the network which may hold one or more pieces of digital structured data.

11. The method of claim 10, wherein the decentralized blockchain is adapted to create a new block with a timestamp upon validating the broadcast authentication request.

12. The method of claim 8, wherein two of the computer nodes comprise a source node and a destination node, and wherein: the source node is adapted to create the reference upon transfer of a portion of a piece of digital structured data from the source node to the destination node; digitally sign a hash of a previous block in the blockchain; digitally sign a public key for the destination node; and request the addition of the reference to a new block in the blockchain.

13. The method of claim 8, wherein the method further comprises: determining whether one or more records of one or more pieces of digital structured data and any modifications made to any portion of the pieces of digital structured data appear in the decentralized blockchain; and if the system is unable to determine the authenticity of the one or more stored pieces of digital structured data, flagging the one or more records of one or more pieces of digital structured data.

14. The method of claim 13, wherein the method further comprises tagging the one or more stored pieces of digital structured data as inauthentic or a possible forgery.

15. A non-transitory computer readable medium storing code executable on one or more computer systems in a network for decentralized digital structured data storage, management, and authentication within an authentication network, comprising: code executable by one or more computer systems operatively participating in in the authentication network for at least temporarily holding one or more pieces of digital structured data; code executable by one or more computer systems operatively participating in the authentication network and at least temporarily holding one or more pieces of digital structured data for broadcasting to all nodes participating in the network an authentication request to authenticate the one or more pieces of digital structured data; and code executable by the one or more computer systems operatively participating in the network as a decentralized blockchain to determine if the creation or modification of the one or more pieces of digital structured data has been previously referenced and added to the blockchain; and if the decentralized blockchain determines that the creation or modification of the one or more pieces of digital structured data has been previously referenced and added to the blockchain, then validating the authentication request, and upon validation, responding to the at least one broadcasting computer node the validation of authenticity of the one or more pieces of digital structured data.

16. The non-transitory computer readable medium of claim 15, wherein the pieces of digital structured data comprise one or more of digital images, digital audio, digital text, digital video, and digital computational graph representations.

17. The non-transitory computer readable medium of claim 15, wherein the decentralized blockchain comprises one or more computer nodes operatively participating in the authentication network which may hold one or more pieces of digital structured data.

18. The non-transitory computer readable medium of claim 15, wherein the decentralized blockchain is adapted to create a new block with a timestamp upon validating the broadcast authentication request.

19. The non-transitory computer readable medium of claim 15, wherein two of the computer nodes comprise a source node and a destination node, the non-transitory computer readable medium further comprising: code executable on the source node for creating the reference upon transfer of a portion of a piece of digital structured data from the source node to the destination node; code for digitally signing a hash of a previous block in the blockchain; code for digitally signing a public key for the destination node; and code for requesting the addition of the reference to a new block in the blockchain.

20. The non-transitory computer readable medium of claim 19, wherein the non-transitory computer readable medium further comprises: code for determining whether one or more records of one or more pieces of digital structured data and any modifications made to any portion of the pieces of digital structured data appear in the decentralized blockchain; and code for flagging the one or more records of one or more pieces of digital structured data if the system is unable to determine the authenticity of the one or more stored pieces of digital structured data.

\* \* \* \* \*